No. 776,291. PATENTED NOV. 29, 1904.
F. A. BROWNELL.
LIGHT EXCLUDING DEVICE FOR PHOTOGRAPHIC PLATE HOLDERS.
APPLICATION FILED SEPT. 14, 1903.
NO MODEL.
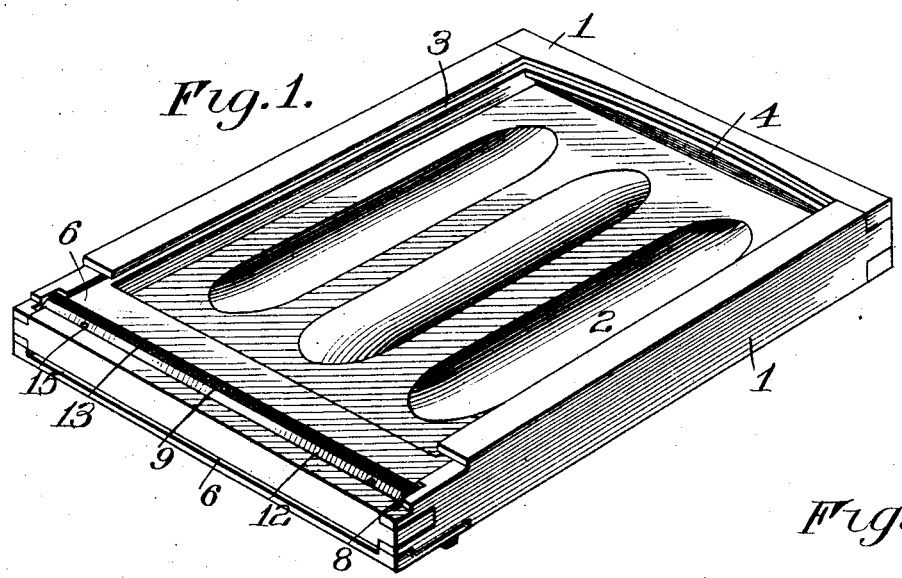
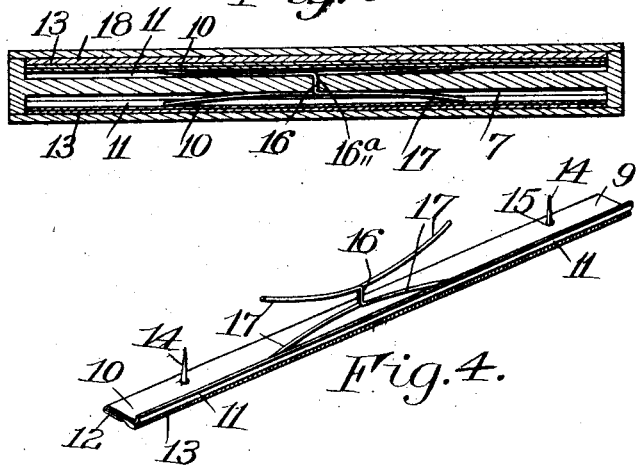
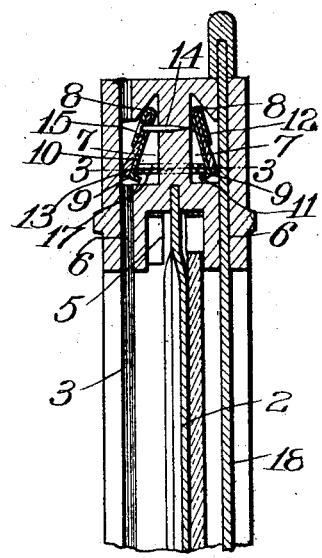
Witnesses.
Walter B. Payne.
Clarence A. Bateman.
Inventor.
Frank A. Brownell
by Frederick F. Church
his Attorney.

No. 776,291.  Patented November 29, 1904.

UNITED STATES PATENT OFFICE.

FRANK A. BROWNELL, OF ROCHESTER, NEW YORK, ASSIGNOR TO EASTMAN KODAK COMPANY, OF ROCHESTER, NEW YORK, A CORPORATION OF NEW YORK.

LIGHT-EXCLUDING DEVICE FOR PHOTOGRAPHIC-PLATE HOLDERS.

SPECIFICATION forming part of Letters Patent No. 776,291, dated November 29, 1904.

Application filed September 14, 1903. Serial No. 173,044. (No model.)

*To all whom it may concern:*

Be it known that I, FRANK A. BROWNELL, of Rochester, in the county of Monroe and State of New York, have invented certain new and useful Improvements in Light-Excluding Devices for Photographic-Plate Holders; and I do hereby declare the following to be a full, clear, and exact description of the same, reference being had to the accompanying drawings, forming a part of this specification, and to the reference-numerals marked thereon.

My present invention relates to improvements in photographic-plate holders; and it has for its object to provide improved light-excluding devices for the slides and means for operating them that shall be comparatively inexpensive to manufacture and reliable and efficient in their action.

To these and other ends my invention consists in certain features of novelty and advantage to be hereinafter more fully described, and pointed out in the claims hereunto annexed.

In the drawings, Figure 1 is a perspective view of a double plate-holder with parts removed, showing my invention applied thereto. Fig. 2 is a transverse sectional view through a plate-holder, showing one of the slides thereof inserted therein. Fig. 3 represents a section on the line 3 3, Fig. 2; and Fig. 4 is a detail view showing the springs and one of the light-excluding devices removed from the holder.

In the several views similar parts are indicated by the same numerals of reference.

In carrying out my invention any suitable form of plate-holder may be employed, the form shown in the present embodiment preferably comprising a frame 1 of the desired dimensions, having a dividing partition or septum 2 and grooves or ways 3 adapted to receive the exposing-slides, any desired number of which may be employed, recesses 4 5, respectively, being provided at each end of the frame thus formed between the slide-receiving ways or grooves and the partition or septum 2 to receive the ends of the sensitized plate in a manner to be hereinafter described.

At one end of the frame thus formed the groove or grooves 3 are continued to the exterior of the frame, forming the apertures or slots 6 6 of a length and width corresponding to the dimensions of the exposing-slide, and in the walls of the slots thus formed are provided recesses 7 7 of a length slightly greater than the length of said slots and having an undercut portion forming an overhanging ledge 8 8. Resting in the recesses thus formed are the light-excluding devices 9 9, each comprising in the present embodiment a comparatively stiff base portion or backing 10, having one edge thereof offset to form a flange 11 and the opposite edge 12 doubled or folded upon itself to securely clamp a strip of felt or other suitable material 13 upon one side thereof, preferably in such manner as to present a free edge thereof in proximity to one of the lateral edges of the backing 10. These light-excluding devices are preferably of a length greater than the width of the slide and are so placed within the recesses 7 7 that the edge 12 thereof will rest beneath the ledge 8 and the flanged edge 11 will be free to move within said recess about said edge 12 as an approximate center, pins or projections 14 14, preferably fixed in the frame and extending through apertures 15 15 of the device, being provided to prevent displacement thereof.

I have devised a novel form of spring that is particularly applicable to a light-excluding device similar to that hereinbefore described, the function of such a spring being to provide an effectual means for exerting a yielding force upon said light-excluding device, normally tending to move it out of its recess into its slot 6 to completely close the latter automatically when the exposing-slide is withdrawn. In the present embodiment of my invention I have shown a pair of such springs applied to a double plate-holder, each comprising a central portion 16, adapted to rest in an aperture 16$^a$, and the arms 17 17, extending in opposite directions from said central portion. A pair of such springs are preferably employed in the present instance, the oppositely-arranged arms of which project into the recesses 7 7 and bear against the light-excluding devices with a pressure tending to move them outwardly. The arms 17 17 of these springs are preferably curved in such a manner that their extremities bear against the light-excluding devices, thereby enabling said arms to be bent freely when said light-excluding devices are depressed by the insertion of the slide, and as the action of the arms bearing against the corresponding light-excluding device at one side of the holder is independent and does not affect the action of the arms at the opposite ends of said spring, due to the relatively fixed central portion thereof, the action thereof upon the light-excluding devices will be uniform irrespective of their relative positions. Springs constructed in this manner may be advantageously used with light-excluding devices of various kinds, it being understood that while I have shown in the present embodiment one particular form of plate-holder to which such springs have been applied I do not so limit myself.

In operating a plate-holder as illustrated in the present embodiment the slide or slides 18 are each slipped into their respective apertures or slots 6 6, the entering edge thereof engaging the inclined surface presented by the light-excluding devices to move them back against the resilient or yielding action of their respective spring-arms 17 17 to open said aperture and admit said slide, the felt or other material 13 bearing against the adjacent side of the slide with a resilient pressure and presenting a pliant or yielding surface that will readily adapt itself to irregularities of the surface with which it abuts. When the slide is withdrawn, however, its corresponding light-excluding device will be moved outwardly under the action of the spring-arms 17 17 in such a manner that the free or exposed edge of the felt or other material 13 will engage the opposite wall of the slot 6 to effectually close said slot to the entrance of light that would affect the sensitized plate lying within the holder with its edges engaging the recessed portions 4 5 thereof.

A plate-holder embodying the hereinbefore-described features of my invention may be readily and cheaply manufactured and will possess the essential requisites of an efficient and durable device, and as there are no parts to wear or become disarranged it will be positive and reliable in operation. The springs for operating the light-excluding devices may be cheaply manufactured of any suitable resilient or elastic material and readily inserted within the holder in such a manner as to facilitate assembling of the parts, and as constructed they will obviously retain themselves in position to eliminate the possibility of displacement, thereby providing means for operating the light-excluding devices that shall be positive and reliable in operation and efficient and durable in use.

It will of course be understood that while I have illustrated my invention in the present embodiment as applied to a double plate-holder I do not so limit myself, as it may be employed with plate-holders of various types and forms having either one or more exposing-slides.

I claim as my invention—

1. In a device of the character described, the combination with the holder adapted to receive an exposing-slide, and a movable light-excluding device therein and adapted to be deflected by said slide when inserted in the holder, of a spring having an intermediate portion engaging the holder and the oppositely-extending resilient arms, one of which bears against the light-excluding device to move it toward the slide.

2. In a device of the character described, the combination with the holder having an aperture therein to receive the exposing-slide, and a light-excluding device mounted in the wall of said aperture, of one or more springs having relatively fixed portions secured in the holder and elastic arms having their extremities extending in a direction transversely of, and bearing against said light-excluding device and normally tending to move it outwardly from said wall.

3. In a photographic-plate holder, the combination with the holder having passages therein to receive the exposing-slide and light-excluding devices movably mounted in recesses formed in the walls of said passages, of a pair of springs each having a relatively fixed central portion secured in position in said holder and oppositely-arranged arms extending in a direction transversely of the line of motion of the slide and exerting a resilient pressure upon said devices tending to move them outwardly from their recesses.

4. In a photographic-plate holder, a spring for operating the light-excluding devices for the slide, having a relatively fixed central portion, and resilient arms extending laterally in opposite directions therefrom and having extremities adapted to bear upon said devices.

5. In a photographic-plate holder, a spring for operating the light-excluding devices having a relatively fixed central portion supported by the holder and a pair of curved arms disposed in relatively opposite directions and at an angle to said central portion, the extremities of which are adapted to exert a resilient pressure upon said devices.

6. In a photographic-plate holder, a spring for operating the light-excluding devices having a central portion and a pair of curved arms bent at an angle to said central portion and extending substantially parallel and in opposite directions in relation to each other.

7. In a photographic-plate holder, a light-excluding device, comprising a backing of stiff material having an edge thereof doubled or folded over to engage and retain a facing-strip of felt or similar material, the opposite edge of the facing-strip being free and adapted to present a yielding surface.

8. A photographic-plate holder having ways to receive the exposing-slides and apertures through which said slides pass, light-excluding devices pivotally mounted in recesses formed in the walls of said apertures, an overhanging portion engaging an edge of each of said devices causing the latter to move about said portion as a pivot, projections entering apertures therein to retain said devices in position, and springs each having a relatively fixed portion thereof extending through said holder and having resilient arms extending into said recesses and bearing against said devices normally tending to move them outwardly therefrom.

9. A photographic-plate holder having ways to receive a pair of exposing-slides, and apertures through which said slides pass, a pair of recesses being formed in the walls of said apertures at opposite sides of the holder and separated by an apertured partition, of light-excluding devices movably mounted in said recesses, and one or more springs each having a portion thereof extending through the aperture of said partition, and having a pair of oppositely-arranged arms lying upon opposite sides thereof and bearing against said light-excluding devices.

10. A photographic-plate holder, having ways to receive the exposing-slides, and apertures through which said slides pass, recesses being formed in the walls of said apertures upon opposite sides of the holder and an apertured partition separating said recesses, of a light-excluding device movably mounted in each recess, and a pair of springs each having a portion thereof extending through the aperture of said partition and provided with a pair of resilient arms extending in opposite directions upon opposite sides of said partition, the extremities of the arms of each spring bearing against the light-excluding devices at opposite sides of the partition.

FRANK A. BROWNELL.

Witnesses:
G. WILLARD RICH,
CLARENCE A. BATEMAN.